(12) United States Patent
Yekhanin et al.

(10) Patent No.: US 12,135,817 B2
(45) Date of Patent: *Nov. 5, 2024

(54) USING A SECURE ENCLAVE TO SATISFY RETENTION AND EXPUNGEMENT REQUIREMENTS WITH RESPECT TO PRIVATE DATA

(71) Applicant: Microsoft Technology Licensing, LLC, Redmond, WA (US)

(72) Inventors: Sergey Yekhanin, Redmond, WA (US); Joshua Stanley Allen, Bellevue, WA (US); Ankit Srivastava, Bellevue, WA (US); Ralph Kennedy Johnston, Jr., Renton, WA (US); Janardhan Dattatreya Kulkarni, Seattle, WA (US)

(73) Assignee: Microsoft Technology Licensing, LLC, Redmond, WA (US)

(\*) Notice: Subject to any disclaimer, the term of this patent is extended or adjusted under 35 U.S.C. 154(b) by 0 days.

This patent is subject to a terminal disclaimer.

(21) Appl. No.: 17/970,148

(22) Filed: Oct. 20, 2022

(65) Prior Publication Data
US 2024/0089100 A1      Mar. 14, 2024

Related U.S. Application Data

(62) Division of application No. 15/931,020, filed on May 13, 2020, now Pat. No. 11,507,687.

(51) Int. Cl.
*G06F 21/62*      (2013.01)
*G06F 21/60*      (2013.01)
(Continued)

(52) U.S. Cl.
CPC ........ *G06F 21/6245* (2013.01); *G06F 21/602* (2013.01); *G06F 21/78* (2013.01);
(Continued)

(58) Field of Classification Search
CPC ... G06F 21/6245; G06F 21/602; H04L 9/0894
See application file for complete search history.

(56) References Cited

U.S. PATENT DOCUMENTS 10,789,363 B1\*    9/2020    Gursoy ............... G06F 21/6254
11,269,522 B2\*    3/2022    Ananthanarayanan ......................
                                                            G06F 21/606

(Continued)

*Primary Examiner* — Phy Anh T Vu
(74) *Attorney, Agent, or Firm* — RAY QUINNEY & NEBEKER P.C.; Adam K. Richards

(57) ABSTRACT

A secure enclave may be used to satisfy privacy requirements and audit requirements. Code may be loaded into the secure enclave. The code may generate a predefined report based on data and added noise. The pre-defined report may be subject to audit requirements. The data may be subject to the privacy requirements. The secure enclave may generate an encryption key and a decryption key based on the code. Only the secure enclave may have access to the decryption key. And the secure enclave may allow only a verified copy of the code to access the decryption key. With the added noise, the report may satisfy a pre-defined differential privacy guarantee. Encrypting the code and ensuring that the report satisfies the differential privacy guarantee may satisfy the privacy requirements. Retaining the report, the code, the secure enclave, and the encrypted data may satisfy the audit requirements.

20 Claims, 7 Drawing Sheets

(51) Int. Cl.
*G06F 21/78* (2013.01)
*G06F 21/86* (2013.01)
*H04L 9/08* (2006.01)
*H04L 9/32* (2006.01)

(52) U.S. Cl.
CPC ............ *G06F 21/86* (2013.01); *H04L 9/0894* (2013.01); *H04L 9/3247* (2013.01); *G06F 2221/2101* (2013.01); *G06F 2221/2149* (2013.01); *H04L 2209/08* (2013.01)

(56) References Cited

U.S. PATENT DOCUMENTS

| | | | | |
|---|---|---|---|---|
| 2014/0157404 A1* | 6/2014 | Chhabra | ................ | G06F 21/54 |
| | | | | 726/22 |
| 2018/0189164 A1* | 7/2018 | Kulkarni | ............. | G06F 21/6245 |
| 2018/0255023 A1* | 9/2018 | Whaley | ............... | H04L 63/0421 |
| 2019/0147188 A1* | 5/2019 | Benaloh | ............. | G06F 21/6245 |
| | | | | 726/26 |
| 2020/0089917 A1* | 3/2020 | Skourtis | ................. | G06F 21/76 |
| 2021/0248253 A1* | 8/2021 | Fuhry | ................ | G06F 21/6245 |
| 2021/0377020 A1* | 12/2021 | Kashid | ................... | H04L 9/083 |

* cited by examiner

USING A SECURE ENCLAVE TO SATISFY RETENTION AND EXPUNGEMENT REQUIREMENTS WITH RESPECT TO PRIVATE DATA

CROSS-REFERENCE TO RELATED APPLICATIONS

This application is a divisional of U.S. patent application Ser. No. 15/931,020, filed May 13, 2020, which is hereby incorporated by reference in its entirety.

BACKGROUND

Individuals use computing devices to perform a wide-range of tasks. These computing devices generally include operating systems that manage hardware and software on the devices. The hardware, software, and operating systems may generate telemetry data during operation. The telemetry data may include information about the device or the user of the device. The telemetry data may include information that can be connected to the user of the device.

Individuals may use computing devices to access cloud-computing services. Users of the devices may generate telemetry data when the users access the cloud services. The telemetry data may include information about the device or the user of the device. The telemetry data may include information that can be connected to the user of the device.

Operating systems and cloud services may collect end-user identifiable information (EUII). The EUII may help improve product and service quality and security. The EUII may be subject to privacy regulations, such as the General Data Protection Regulation (GDPR). The EUII may also be used to generate metrics shared in public reports, such as in earnings reports. The public reports may be subject to compliance with audit obligations under laws such as Sarbanes Oxley. The need to preserve public business records (sometimes for more than a decade) to comply with audit obligations while also ensuring individual user privacy appear to be in direct conflict.

SUMMARY

In accordance with one aspect of the present disclosure, a method is disclosed that includes receiving data. The data includes personal information of one or more individuals and is subject to privacy requirements. The method also includes loading code into a secure enclave. The code includes aggregation code and noise code. The method also includes generating, by the secure enclave, an encryption key and a decryption key. The decryption key may be tied to the secure enclave and the code. The method further includes encrypting the data using the encryption key to generate encrypted data. The method further includes providing the encrypted data to the secure enclave. The method further includes decrypting, by the secure enclave, the encrypted data using the decryption key to generate decrypted data. The method further includes adding, by executing the noise code, noise to the decrypted data. The method further includes generating, by executing the aggregation code, a report based on the decrypted data and the noise. The report aggregates the decrypted data, satisfies a differential privacy guarantee based on the privacy requirements, and is subject to audit requirements. The method further includes retaining the encrypted data for a period of time based on the audit requirements.

The method may further include signing the code with a digital signature and verifying, before decrypting the encrypted data, the digital signature.

A length of the period of time may be based on the audit requirements.

The method may further include logging the generation of the report to a tamper-proof store.

The method may further include incrementing a count of a tamper-proof monotonic counter.

The tamper-proof monotonic counter may be included in the code.

The method may further include determining, after generating the report, whether the count equals a destruction count. The secure enclave may destroy the decryption key when the count of the tamper-proof monotonic counter equals the destruction count.

The method may further include persisting the secure enclave to disk. The count may have a first value. The method may further include rehydrating the secure enclave. The count may have the first value. The method may further include generating the report an additional time. The method may further include incrementing the count of the tamper-proof monotonic counter to a second value greater than the first value.

The method may further include determining, based on a trusted clock source, whether a fixed amount of clock time has elapsed since generating the report. The secure enclave may destroy the decryption key when the fixed amount of clock time has elapsed.

Adding the noise may include generating fresh noise.

Adding the noise may include using a deterministic source of noise and only the secure enclave knows a seed of the deterministic source of noise.

In accordance with another aspect of the present disclosure, a system is disclosed that includes one or more processors, memory in electronic communication with the one or more processors, and instructions stored in the memory. The instructions are executable by the one or more processors to receive data. The data comprises personal information of one or more individuals and is subject to privacy requirements. The instructions are further executable by the one or more processors to load code into a secure enclave. The code includes aggregation code and noise code. The instructions are further executable by the one or more processors to generate, by the secure enclave, an encryption key and a decryption key. The decryption key is tied to the secure enclave and the code The instructions are further executable by the one or more processors to encrypt the data using the encryption key to generate encrypted data. The instructions are further executable by the one or more processors to provide the encrypted data to the secure enclave. The instructions are further executable by the one or more processors to decrypt, by the secure enclave, the encrypted data using the decryption key to generate decrypted data. The instructions are further executable by the one or more processors to add, by executing the noise code, noise to the decrypted data. The instructions are further executable by the one or more processors to generate, by executing the aggregation code, a report based on the decrypted data and the noise. The report aggregates the decrypted data, satisfies a differential privacy guarantee based on the privacy requirements, and is subject to audit requirements. The instructions are further executable by the one or more processors to retain the encrypted data for a period of time based on the audit requirements.

The system may include instructions further executable by the one or more processors to sign the code with a digital signature and verify, before decrypting the encrypted data, the digital signature.

A length of the period of time may be based on the audit requirements.

The system may include instructions further executable by the one or more processors to log the generation of the report to a tamper-proof store and increment a count of a tamper-proof monotonic counter.

The system may include instructions further executable by the one or more processors to determine, after generating the report, whether the count equals a destruction count. The secure enclave may destroy the decryption key when the count of the tamper-proof monotonic counter equals the destruction count.

The system may include instructions further executable by the one or more processors to determine, based on a trusted clock source, whether a fixed amount of clock time has elapsed since generating the report. The secure enclave may destroy the decryption key when the fixed amount of clock time has elapsed.

In accordance with another aspect of the present disclosure, a computer-readable medium comprising instructions that are executable by one or more processors is disclosed. The instructions that are executable by the one or more processors cause a computing system to receive data. The data comprises personal information of one or more individuals and is subject to privacy requirements. The instructions that are executable by the one or more processors cause the computing system to load code into a secure enclave. The code includes aggregation code and noise code. The instructions that are executable by the one or more processors cause the computing system to generate, by the secure enclave, an encryption key and a decryption key. The decryption key is tied to the secure enclave and the code The instructions that are executable by the one or more processors cause the computing system to encrypt the data using the encryption key to generate encrypted data. The instructions that are executable by the one or more processors cause the computing system to provide the encrypted data to the secure enclave. The instructions that are executable by the one or more processors cause the computing system to decrypt, by the secure enclave, the encrypted data using the decryption key to generate decrypted data. The instructions that are executable by the one or more processors cause the computing system to add, by executing the noise code, noise to the decrypted data. The instructions that are executable by the one or more processors cause the computing system to generate, by executing the aggregation code, a report based on the decrypted data and the noise. The report aggregates the decrypted data, satisfies a differential privacy guarantee based on the privacy requirements, and is subject to audit requirements. The instructions that are executable by the one or more processors cause the computing system to retain the encrypted data for a period of time based on the audit requirements.

The computer-readable medium may further comprise instructions that are executable by the one or more processors to cause the computing system to log the generation of the report to a tamper-proof store, increment a count of a tamper-proof monotonic counter, and determine, after generating the report, whether the count equals a destruction count. The secure enclave may destroy the decryption key when the count of the tamper-proof monotonic counter equals the destruction count.

The computer-readable medium may further comprise instructions that are executable by the one or more processors to cause the computing system to determine, based on a trusted clock source, whether a fixed amount of clock time has elapsed since generating the report. The secure enclave may destroy the decryption key when the fixed amount of clock time has elapsed.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows. Features and advantages of the disclosure may be realized and obtained by means of the systems and methods that are particularly pointed out in the appended claims. Features of the present disclosure will become more fully apparent from the following description and appended claims, or may be learned by the practice of the disclosed subject matter as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. Understanding that the drawings depict some example embodiments, the embodiments will be described and explained with additional specificity and detail through the use of the accompanying drawings in which.

DETAILED DESCRIPTION

Figure 1:
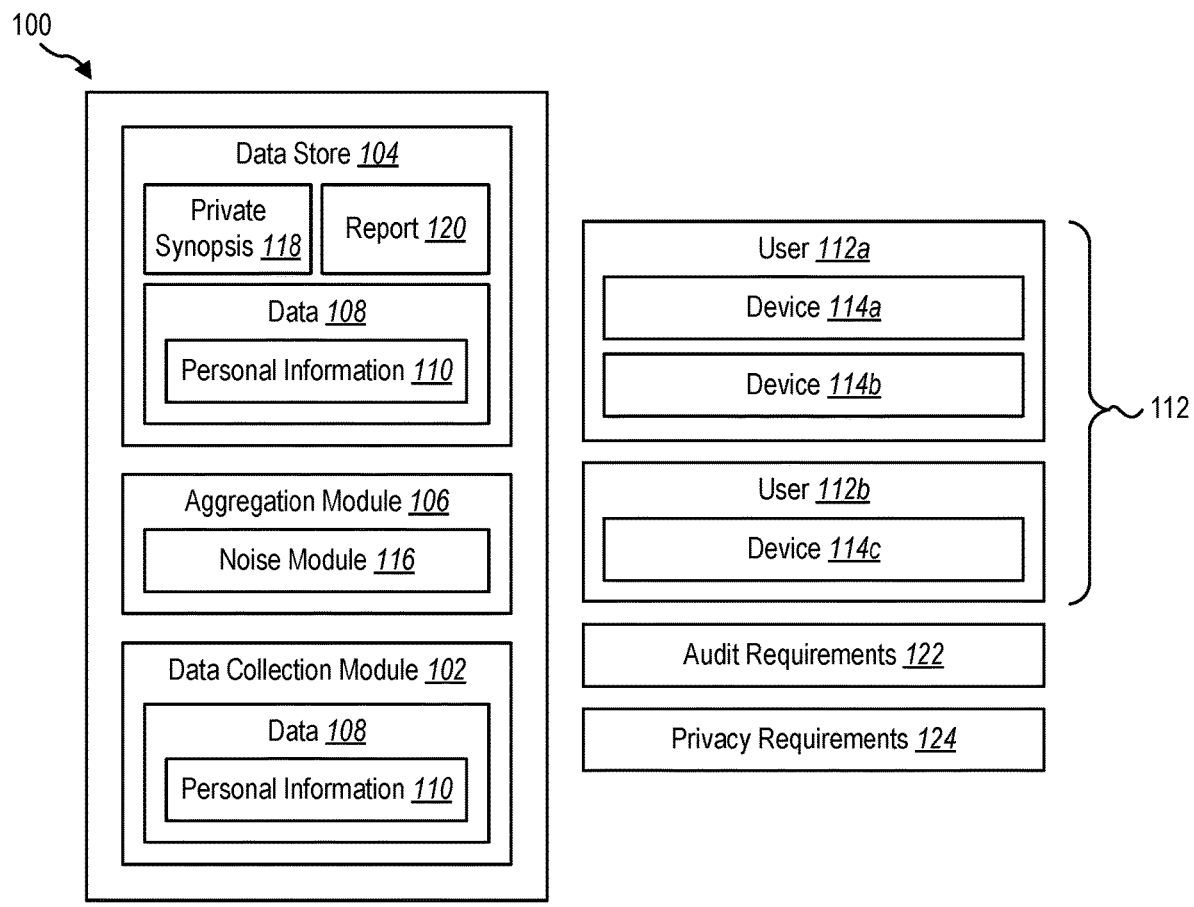
FIG. 1 illustrates an example system for satisfying audit requirements and privacy requirements using a private synopsis.

An enterprise, such as an operating system or cloud-services provider, may collect large amounts of data generated by end users and end-user devices. The enterprise may use the data to improve product and service quality. The enterprise may also use the data to report performance metrics. The collection, storage, and use of data may trigger both privacy obligations and retention obligations.

Applicable laws, regulations, and service agreements may impose on the enterprise obligations to protect the privacy of persons whose data the enterprise collects. Data the enterprise collects may include personal information (which may also be referred to as end-user identifiable information or private data). Personal information may include personal identifiable information. Personal information may include any information or record that can conceivably be linked to a person. Even information that has been anonymized and does not include a personal identifier may be "personal information." For example, records with many dimensions may be used to create "fingerprints" to re-identify users. Access to external information may assist adversaries in linking records to individuals. Even aggregated data may leak personal information. For example, even sparse data sets have been shown to be vulnerable to re-identification through the use of privacy attacks. Aggregation queries executed on measures across various dimensions pose a definite and measureable risk of re-identification of individuals.

Laws and regulations, such as the General Data Protection Regulation (GDPR), may detail data protection and privacy requirements. Private agreements may also include data protection and privacy requirements. Privacy requirements may include requirements to place certain protections on access to collected data and to expunge the collected data after a defined period of time. The privacy requirements may also require that any aggregate figures or metrics created using the collected data not allow the underlying collected data to be recovered or re-identified (or at least provide a defined level of guarantee against re-identification). For example, an adversary may use linear-programming record recovery attacks to recover the individual records of the collected data that compose an aggregate. Privacy requirements may require that an aggregate created using the collected data not leak private information in response to such an attack.

One way to prevent privacy attacks is through differential privacy. Differential privacy is one method for perturbing aggregates to shield underlying records from privacy attacks. Data that has been aggregated with differential privacy is widely considered to be the "gold standard" for data that cannot be re-identified. Differential privacy is sometimes referred to as "privacy through process" because the privacy guarantees come from a mathematically rigorous process of transforming data and applying noise.

In addition to privacy requirements, the data the enterprise collects may also be subject to retention requirements. The enterprise may use collected data to calculate metrics or financial figures. The enterprise may include the metrics or financial figures in a public report or government filing. The public report or government filing may be subject to audit under applicable laws and regulations, such as Sarbanes Oxley. Auditors may not inspect every piece of source data used to create reports that are subject to audit. But the applicable audit requirements may require that the enterprise retain data underlying the publicly reported numbers sufficient to allow auditors to validate that proper reporting processes were followed, data was not falsified or tampered with, and results are reproducible. The audit process may involve re-running reports, analyzing activity logs, and reviewing communications from the time period being investigated.

Retaining data to meet audit requirements may be in tension with privacy obligations that require expungement of the data. Current approaches to protecting privacy often come at the expense of audit obligations. This disclosure describes systems and methods for satisfying both obligations—retaining private data necessary to satisfy audit and retention obligations while also protecting the private data from privacy attacks.

One method may involve use of an intermediate aggregation of collected data. The data may be composed of source records containing personal information. The data may be subject to privacy requirements. The enterprise may use the data to create reports that are subject to audit requirements. The method may include adding differential privacy noise to the data and generating a private synopsis based on the noisy data. Generating the private synopsis may include aggregating the data and the noise to create a summary of the data that does not include the individual source records of the data. Thus, the private synopsis may summarize the data and not include the data itself. The private synopsis may be computed at the finest grain possible to satisfy audit requirements while also satisfying a privacy guarantee for preventing an adversary from linking information in the private synopsis to an individual. After generating the private synopsis, the data may be destroyed. The private synopsis (or multiple private synopses) may be used to create a target report. The target report (such as a financial report or an active user count) may be an aggregation or summary of information contained in the private synopsis. The target report may be subject to audit requirements.

This approach eliminates the potential for replay attacks that add new noise because the source records are expunged. The privacy protections endure, and no further risk of misuse exists after the source records are expunged. Potential drawbacks of this approach, however, are that reports can never be regenerated from source data and that proper application of noise cannot be verified.

Another method involves use of encryption and a secure enclave. The method may include collecting and storing data that may include personal information and that is subject to privacy requirements. The data may be used to generate a report that is subject to audit requirements. Code used to generate the report may be loaded into the secure enclave. The secure enclave may generate an encryption key and a decryption key pair based on the code. The secure enclave may store the decryption key such that only the secure enclave has access to the decryption key. The secure enclave may access the decryption key only while executing the code. The data may be encrypted using the encryption key. As a result, the data is no longer accessible in unencrypted form and can be decrypted by only the secure enclave. The secure enclave may be hard-coded to perform processing needed to produce a pre-defined report (or predefined reports) using the encrypted data. The secure enclave may be hard-coded to introduce noise into the data as part of generating the report such that the report satisfies a pre-defined privacy guarantee protecting the data from re-identification. The secure enclave may not be able to perform any processing on the data other than introducing noise and generating the report, which may be functions included in the code. In other words, the only processing the secure enclave may cause to be performed on the encrypted data is the processing described in the code loaded into the secure enclave at the time the secure enclave generated the encryption key. The functionality of the secure enclave may be cryptographically attested and verifiable by third parties.

This method provides strong audit and privacy guarantees. It allows reports to be reproduced during an audit (thus satisfying the audit requirements) while ensuring that the data cannot be used for any purpose other than audits. The data would be retained exactly but encrypted in a way that makes re-identification essentially impossible. That may satisfy the privacy requirements. The data can be considered expunged for privacy purposes but available for use in an audit. For example, GDPR uses the example of data that has been encrypted and the encryption key subsequently destroyed as being data that is "not personal data." The secure enclave approach meets the regulatory requirements for expungement whenever the secure enclave destroys the decryption key, even if the encrypted data remains on disk. But the encrypted data meets the same definition before the decryption key is destroyed because the system provides strong guarantees that only privacy-preserving transforms are possible. Furthermore, because the original source data is available to the secure enclave, the reports generated may be aggregated to a very high level. Thus, the reports generated by the secure enclave may not need to tread close to the boundary between private and non-private and are not susceptible to privacy attacks.

To further limit potential for a privacy leak the enclave method may also place one or more limits on use of the decryption key. Placing limits on use of the decryption key may involve implementing tamper-proof logging. To support tamper-proof logging the secure enclave may be hard-coded to log start and end operations to a tamper-proof store. In other words, the code that includes the aggregation and noise functions may also include the tamper-proof logging functionality. The tamper-proof store may be a long-running, fault-tolerant cluster running a consensus algorithm like Raft. In the alternative, the secure enclave may log operations as a meaningful hash included in a transaction to a large public blockchain such as Ethereum. In all these cases, the secure enclave code assures that logging happens on every report, and the choice of log target provides assurances against tampering.

Placing limits on use of the decryption key may also involve limiting the secure enclave to generating a fixed number of reports. After the secure enclave generates the fixed number of reports, the secure enclave may destroy the decryption key. To support this limit the secure enclave may be hard-coded to reference a tamper-proof monotonic counter. Monotonic counters are available in some specialized hardware or may be implemented on top of any of the tamper-proof stores mentioned above.

Placing limits on the use of the decryption key may involve limiting use of the decryption key to a fixed time period. After the fixed time period has lapsed, the secure enclave may destroy the decryption key. The secure enclave may use a tamper-proof source of clock time to support this limit. The secure enclave may be hard-coded to trust a clock source that is likely to be trusted by privacy regulators, auditors, and users. In the alternative, the secure enclave may be hard-coded to reference a large public blockchain where proof-of-work difficulty is tied to clock time. For example, the Bitcoin block mining process is a Poisson process tuned to return blocks on average every ten minutes, despite wide variance in actual block mining times. Checking the block height on such a blockchain may not be accurate enough to expunge keys in increments of a few hours to a day or two but may be trustworthy for longer durations. Over much longer time frames, however, there is greater risk that code or design changes to the underlying blockchain could make the block-to-clock calculations invalid. Therefore, the secure enclave may include a periodic refresh mechanism for longer durations. For example, the system may adjust the clock-to-block ratio (if needed) once per year, with such adjustments being logged.

Another approach may involve a hybrid use of the private synopsis method and the secure enclave method. One potential example may be as follows. Data that includes personal information may be encrypted and made available to a secure enclave for a defined period of time (such as six months). After the defined period of time has passed, the encrypted data may be aggregated to create a private synopsis. The data may be aggregated to a level with just enough privacy guarantee to meet expungement requirements. The private synopsis may be optimized to support any necessary adjustments or restatements to previous reports. Companies may make mistakes in some reporting periods and issue corrections or adjustments. The adjustments are typically not applied to the reporting period that included the error. The private synopsis may be encrypted using a key different from the key used to encrypt the data. The key used to encrypt the data may be destroyed, and the data may be expunged. Furthermore, after a second defined period has past, the private synopsis may be aggregated at a higher level and encrypted using a second new key. The key used to encrypt the private synopsis may be destroyed. The enterprise may retain the aggregated private synopsis for a third defined period.

FIG. 1 illustrates an example system 100 for managing data to meet privacy requirements 124 and audit requirements 122. The system 100 may include a data collection module 102, a data store 104, and an aggregation module 106.

The data collection module 102 may receive data 108. The data 108 may include one or more source records. The data collection module 102 may receive the data 108 from one or more sources. The one or more sources may be devices, such as devices 114a-c, that produce telemetry data. The one or more sources may include financial and sales databases and files. The one or more sources may be a cloud-computing service. The one or more sources may be individuals who manually generate source records, such as an individual who fills out a form on a website.

The data 108 may be encrypted or unencrypted when the data collection module 102 receives the data 108. For example, the devices 114a-c may include an encryption module that encrypts telemetry data before providing it to the data collection module 102.

The data 108 may be associated with users 112. The users 112 may use the devices 114a-c for personal or business purposes, and the devices 114a-c may generate telemetry data. The telemetry data may include information regarding use of the devices 114a-c or the users 112. For example, the telemetry data may include information about locations of the devices 114a-c, errors experienced by the devices 114a-c or software running on the devices 114a-c, time spent on certain applications running on the devices 114a-c, or whether the devices 114a-c are actively being used.

The enterprise may want to use or share information contained in or about the data 108. For example, the enterprise may sell a particular software program. The data 108 may include information about how much time the users 112 have spent using the particular software program during the past three months. The enterprise may want to use the data 108 to tell investors that the amount of time the users 112 are spending using the particular software is growing each month. The enterprise may also want to issue a report that includes the total amount of time that the users 112 have spent on the software each month.

The data 108 may include personal information, such as personal information 110. Personal information may be any information or source record that can be linked to a person. For example, personal information may include personal identifiable information, such as a name of user 112a. Personal information may include information about a person that can be connected to that person. For example, the personal information 110 may include location information of user 112*b* that is not expressly connected to the user 112*b* but that could be connected to the user 112*b* using data analytics or other means. The data 108 may be subject to the privacy requirements 124 because the data 108 includes the personal information 110.

The data collection module 102 may perform one or more operations on the data 108, such as a filtering operation. The data collection module 102 may retain the data 108 only temporarily during the collection process. The system 100 may store the data 108 on the data store 104. The data store 104 may be any device or system capable of storing electronic information.

The aggregation module 106 may perform aggregations on the data 108. The aggregation module 106 may produce summaries or reports based on the aggregations of the data 108. The aggregation module 106 may receive the data 108 from the data collection module 102 or obtain the data 108 from the data store 104.

An aggregation may include any data transformation that takes individual records and transforms them into some form of summary. Functions such as COUNT, SUM, MEAN, and VARIANCE are examples of aggregations. A linear-regression model is an example of an aggregation. A deep learning neural-network model is also an example of an aggregation.

Aggregating data may include performing a function or operation on two or more records and then returning a result of the function or operation without returning the two or more records. The result of the function or operation may be a summary of the two or more records. For example, an enterprise may provide a service accessible by users, such as the users 112. The data collection module 102 may collect data on a number of active user accounts associated with the service. The data 108 may include an individual record associated with each active user account. The individual records may include information about a location of a user associated with the account. The enterprise may want to disclose a number of active user accounts for each state of the United States. Calculating the number of active user accounts for each state and returning those numbers without the underlying records may be one example of aggregating the data. As another example, data may include individual records that show how much time each user spent playing a particular game in a given month. Calculating an average amount of time by all users playing the particular game in the given month and returning that average without the underlying records may be another example of aggregating the data.

Aggregating data may include determining whether the records satisfy a particular query. For example, determining, based on sales records, whether sales for a certain period exceeded a particular threshold and returning a result (yes or no) is an example of aggregating data.

The aggregation module 106 may include a noise module 116. The noise module 116 may generate noise or obtain noise from a noise source. The noise module 116 may add noise to a process of the aggregation module 106 generating an output. For example, the noise module 116 may add noise to the data 108 before the aggregation module 106 aggregates the data 108 or generates a summary of the data 108. As another example, the noise module 116 may add noise to the output of the aggregation module 106. As another example, the noise module 116 may add noise to parameters of a model generated by the aggregation module 106. The amount of noise the noise module 116 adds and the level or step at which the noise module 116 adds noise may impact how much the accuracy of the output of the aggregation module 106 is reduced and how strong the output of the aggregation module 106 will be against a privacy attack.

The noise module 116 may determine an amount of noise to add. The noise module 116 may add an amount of noise sufficient to ensure that the summary generated by the aggregation module 106 satisfies a particular privacy guarantee. The particular privacy guarantee may be a differential privacy guarantee. The particular privacy guarantee may be pre-defined. The particular privacy guarantee may be determined by the enterprise. The particular privacy guarantee may be determined based on the privacy requirements 124. Satisfying the particular privacy guarantee may satisfy the privacy requirements 124.

The aggregation module 106 may generate a private synopsis 118 based on the data 108. For example, assume the data 108 includes records showing sales revenue in the United States for a particular product. Assume the records include information about the geographic location where a sale was made. The private synopsis 118 may show sales revenue for the particular product by zip code.

The private synopsis 118 may be a summary of the data 108 with noise added. The noise added may be differentially private noise. The amount of differentially private noise added may be an amount necessary for the private synopsis 118 to achieve a defined differential privacy guarantee. The private synopsis 118 may be an aggregated report over the original source records of the data 108 with differentially private noise added. In the example described above, the private synopsis 118 may show sales revenue figures that are not identical to the actual sales records because of the noise added to the data 108.

In generating the private synopsis 118, the aggregation module 106 may aggregate the data 108 at a level high enough to protect the underlying source records from re-identification. The lower the level of granularity of the data aggregation, the more noise the noise module 116 must insert to maintain a defined differential privacy guarantee. If the aggregation module 106 aggregates at a higher level, accuracy increases. The aggregation module 106 may compute the private synopsis 118 at the finest grain possible to allow audits (i.e., to satisfy the audit requirements 122) while meeting the technical requirement of making the data 108 being impossible to link to individuals (i.e., satisfying the privacy requirements 124). In the alternative, the aggregation module 106 may compute the private synopsis 118 at a particular level based on a desired accuracy, the privacy requirements 124, and the audit requirements 122.

After generating the private synopsis 118, the system 100 may expunge the data 108. The system 100 may expunge the data 108 a defined period of time after collecting the data 108. The defined period of time may be based on the privacy requirements 124. The system 100 may store the private synopsis 118 in the data store 104 even after expunging the data 108. The system 100 may store the private synopsis 118 for a defined period of time. The defined period of time may be based on the audit requirements 122. Storing the private synopsis 118 after expunging the data 108 may comply with the privacy requirements 124 because the private synopsis 118 satisfies a defined privacy guarantee.

The aggregation module 106 may generate a report 120. The aggregation module 106 may generate the report 120 using the private synopsis 118. The report 120 may be a summary or aggregation of the private synopsis 118. The report 120 may be aggregated at a higher level than the private synopsis 118. For example, assume the private synopsis 118 shows revenue by zip code. The report 120 may show revenue by state. The report 120 may be subject to the audit requirements 122. The private synopsis 118 may satisfy the audit requirements 122, even without access to the data 108. The private synopsis 118 may also satisfy the privacy requirements 124.

With this approach, replay attacks that add new noise are not a concern because the data 108 is expunged. The privacy protections endure, and no further risk of misuse exists after the data 108 is expunged. A potential drawback of this approach, however, is that the report 120 cannot be regenerated from the data 108 and proper application of noise cannot be verified.

The audit requirements 122 may be requirements and obligations imposed by laws, rules, regulations, or agreements. The audit requirements 122 may concern an enterprise's obligation to provide means for an independent auditor to verify the process used to generate a particular report or aspect of the report. The audit requirements 122 may include data retention obligations. The audit requirements 122 may require that certain data be retained for a defined length of time. The audit requirements 122 may require that the enterprise preserve information sufficient to allow an auditor to audit a report and statements made in the report. The audit requirements 122 may not, however, require that an auditor be able to inspect every piece of source data used to create the report. Audits may focus on validating that proper reporting processes were followed, data was not falsified or tampered with, and results are reproducible. The audit process may involve re-running reports, analyzing activity logs, and reviewing communications from the time period being investigated. The audit requirements 122 may require that an auditor be able to verify that data has not been tampered with, that the data transformation process was the correct process, and that report is reproducible using the same data.

The privacy requirements 124 may be requirements and obligations imposed by laws, rules, regulations, or agreements. The privacy requirements 124 may concern protecting the privacy of individuals whose data is collected and used. The privacy requirements 124 may concern protecting private information from third-party access. The privacy requirements 124 may include obligations to impose controls on access to certain data. The privacy requirements 124 may include expungement obligations. The privacy requirements 124 may require that certain data be expunged a defined period of time after collection. The privacy requirements 124 may cover any information that could be linked to an individual. The privacy requirements 124 may require that data aggregations not allow privacy attacks to link underlying records to individuals.

Modern privacy regulations and practices define a category of data where data cannot, in principle, be linked to an individual. Data that has been aggregated with differential privacy is widely considered to be the "gold standard" for data that cannot be re-identified. Data that cannot be re-identified, due to privacy-preserving aggregation, may no longer be subject to regulations regarding expungement of private data. In other words, data that is aggregated and protected with differential privacy may be retained and used indefinitely with no risk of harm to users. In that case, expunging the individual source records—while retaining the aggregated data—may be sufficient to meet the privacy requirements 124. Differential privacy is sometimes referred to as "privacy through process" because the privacy guarantees come from a mathematically rigorous process of transforming data and applying noise. Privacy guarantees can be weakened if an adversary can subvert the process; for example, by replaying the processing while introducing different noise.

The robustness of aggregated data against privacy attacks may be referred to as a privacy guarantee of the aggregated data. In other words, the privacy guarantee may be one or more values that represent the likelihood that an adversary can infer information about the underlying data using a privacy attack. One type of privacy guarantee may be a differential privacy guarantee. Differential privacy may include a class of algorithms for protecting data from privacy attacks. Differential privacy noise may satisfy certain properties. Differential privacy may allow a mathematical measurement of how secure from privacy attacks aggregated data is. Differential privacy may allow a mathematical measurement of the degree of privacy provided. Differential privacy allows a determination of how protected the data underlying an aggregation is from privacy attacks. Adding differential privacy noise introduces definable and measurable error.

A differential privacy guarantee may include an epsilon parameter. The epsilon ($\epsilon$) parameter may measure the strength of a differential privacy guarantee. The $\epsilon$ for a differential privacy guarantee may give an upper bound on the probability of a particular model output varying as a result of including (or removing) a single record. The smaller the epsilon, the stronger the differential privacy guarantee.

For example, Let A: $D^n \to Y$ be a randomized algorithm. Let $D_1, D_2 \in D^n$ be two databases that differ in at most entry (we call these databases neighbors).

Let $\epsilon > 0$. Define A to be $\epsilon$-differentially private if for all neighboring databases $D_1$ and $D_2$ and for all (measurable) subsets $S \subset Y$, there exists:

$$\frac{Pr[A(D_1) \in S]}{Pr[A(D_2) \in S]} \leq \exp(\epsilon)$$

Equation 1: $\epsilon$-Differential Privacy
where the probability is taken over the coin tosses of A. By convention, if both values in the numerator and denominator are 0, the ratio is 1. This is a strong security notion because it requires algorithm A to have very low probability difference for "every" output set S even if the probabilities $Pr[A(D_1) \in S]$ and $Pr[A(D_2) \in S]$ themselves are negligible i.e. are very unlikely events.

Let $\delta > 0$. A relaxed definition of ($\epsilon$, $\delta$)—differential privacy—is:

$$Pr[A(D_1) \in S] \leq e^\epsilon * Pr[A(D_2) \in S] + \delta$$

Equation 2: ($\epsilon$, $\delta$)-Differential Privacy

In Equation 2, addition of $\delta$ term allows highly unlikely events with negligible probabilities $Pr[A(D_1) \in S]$ and $Pr[A(D_2) \in S]$ to break the condition of $\epsilon$-differential privacy but with a probability $\leq \delta$. This definition properly bounds such "bad" events but at least allows them to occur thereby being more relaxed.

In large data collection systems, there may be substantial error in any reported number. The estimate variance due to selection bias, measurement error, and other factors tends to dwarf the miniscule error introduced to protect privacy. Although the purpose of an audit is to verify accuracy, the tolerable error bounds are generally much wider than anything that would be a concern for privacy. But these reporting errors do not provide adequate privacy guarantees because the noise introduced as part of the differential privacy process must meet certain requirements that are impossible to guarantee with uncontrolled error sources.

Another system for satisfying privacy requirements and audit requirements may involve a secure enclave. Code may be loaded into the secure enclave. The code may be designed to generate a predefined report based on data. The predefined report may be subject to the audit requirements. An auditor may inspect and verify the functions of the code. The data may be subject to the privacy requirements. The code may be signed with a digital signature. The secure enclave may generate an encryption key and a decryption key based on the signed code. Only the secure enclave may have access to the decryption key. And the secure enclave may allow only a verified copy of the code to access the decryption key. Thus, once the data is encrypted using the encryption key, only the secure enclave may access the data and the only data transformations that may be applied to the data are those defined in the code. The code may generate the report based on the data and added noise. With the added noise, the report may satisfy a differential privacy guarantee. The differential privacy guarantee may be pre-defined based on the privacy requirements. Encrypting the code and ensuring that the report satisfies the differential privacy guarantee may satisfy the privacy requirements. The report, the code, the secure enclave (which may be persisted to disk and rehydrated), and the encrypted data may be retained for a defined period of time based on the audit requirements. Doing so may satisfy the audit requirements.

Figure 2:
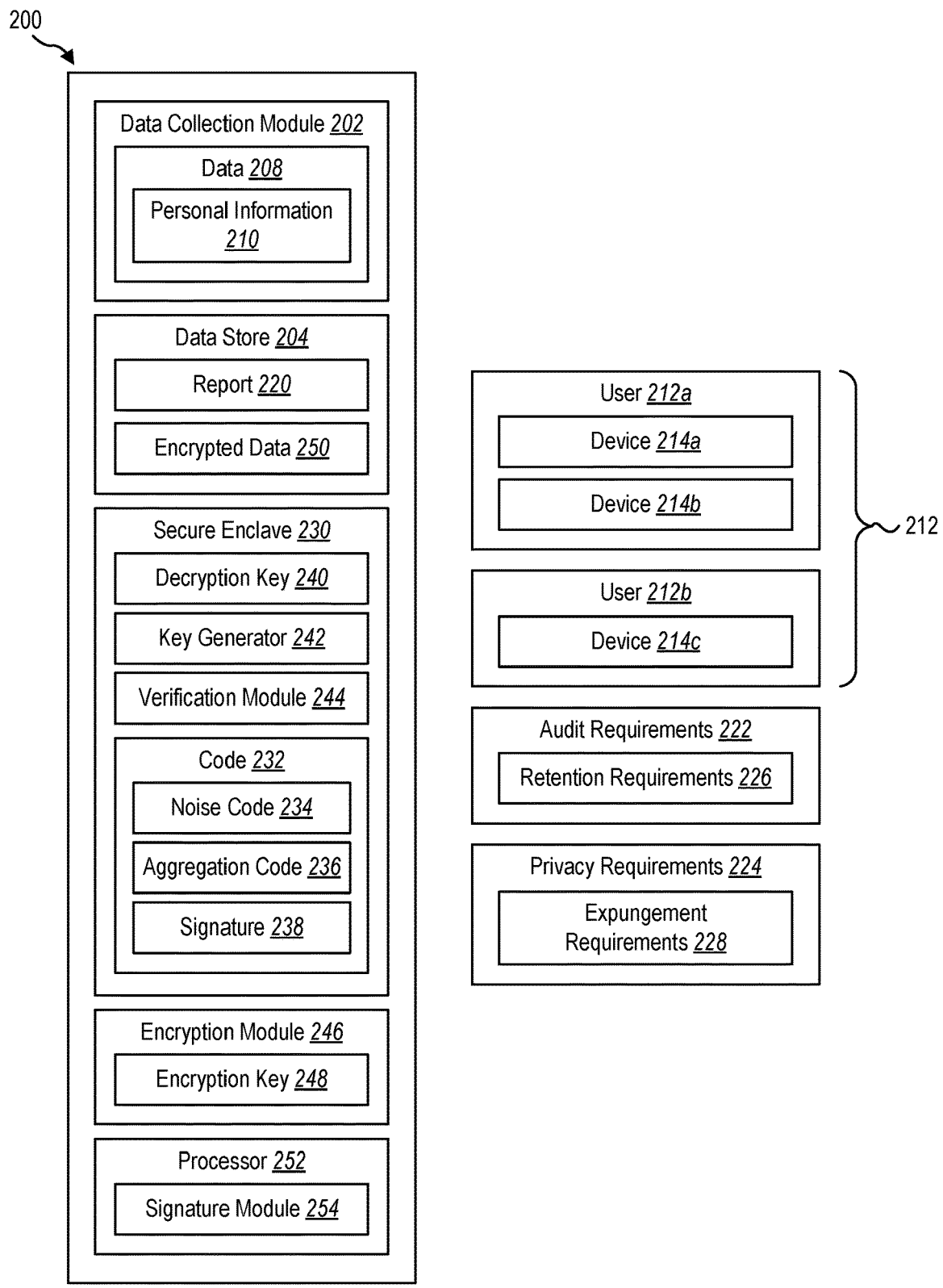
FIG. 2 illustrates an example system for satisfying audit requirements and privacy requirements using a secure enclave.

FIG. 2 illustrates an example system 200 for satisfying privacy requirements 224 and audit requirements 222 with respect to data 208 containing personal information 210. The system 200 may include a data collection module 202, an encryption module 246, a data store 204, and a secure enclave 230.

The data collection module 202 may receive the data 208. The data collection module 202 may receive the data 208 from one or more sources. The data 208 may be associated with users 212. The personal information 210 may be associated with the users 212. The data collection module 202 may have any of the features or perform any of the functions described in connection with the data collection module 102.

The encryption module 246 may receive unencrypted data and produce encrypted data. The encryption module 246 may encrypt the data 208 to generate encrypted data 250. The encryption module 246 may use an encryption key 248 to encrypt the data 208. The secure enclave 230 may generate the encryption key 248 using key generator 242. Only the secure enclave 230 may have access to a key to decrypt the encrypted data 250. The system 200 may store the encrypted data 250 on the data store 204. The encryption module 246 may encrypt the data 208 without preserving an unencrypted version of the data 208. In the alternative, the system 200 may retain an unencrypted version of the data 208 for a defined period of time after collection and then expunge the data 208 after the defined period of time. The defined period of time may be based on the privacy requirements 224.

The secure enclave 230 may be a trusted execution environment. The secure enclave 230 may be a defined region of memory whose contents cannot be read or saved by any software, including the operating system and even hypervisor, not stored in the secure enclave 230. A set of instruction codes, such as Intel® Software Guard Extensions (Intel® SGX) or AMD Secure Encrypted Virtualization (SEV), built into a processor, such as processor 252, may support creation and use of the secure enclave 230. The set of instructions and the secure enclave 230 may allow a remote party to run an unmodified program with confidentiality and/or integrity protection even if the rest of the system is malicious. Code and data stored in the secure enclave 230 may trust only the secure enclave 230 and may treat any process outside the secure enclave 230, including an operating system or a hypervisor, as potentially hostile. The processor 252 may encrypt information stored in the secure enclave 230 and decrypt the information on-the-fly within the processor 252 itself.

The secure enclave 230 may include a decryption key 240. The secure enclave 230 may generate the decryption key 240 using the key generator 242. The decryption key 240 may allow the secure enclave 230 to decrypt the encrypted data 250 to reproduce the data 208. In other words, the secure enclave 230 may gain access to the data 208 using the decryption key 240. Only code included in the secure enclave 230 may be able to access the decryption key 240. Only the secure enclave 230 that generates the decryption key 240 (and not a different secure enclave) may be able to use the decryption key 240 to decrypt the encrypted data 250.

The secure enclave 230 may generate the decryption key 240 at the time the secure enclave 230 generates the encryption key 248. The decryption key 240 and the encryption key 248 may be a pair. The secure enclave 230 may generate the decryption key 240 after code 232 is loaded into the secure enclave 230. The encryption key 248 and the decryption key 240 may be based on the code 232. The code 232 may include a signature 238. The secure enclave 230 may not be able to cause decryption of the encrypted data 250 unless the secure enclave 230 includes the code 232 that was loaded into the secure enclave 230 at the time the secure enclave 230 generated the decryption key 240. In other words, only the code 232 may be able to cause the secure enclave 230 to access the decryption key 240.

The decryption key 240 may be unique to the secure enclave 230. Placing the code 232 on another secure enclave may not generate the decryption key 240. The decryption key 240 may be tied to the code 232 and the specific hardware enclave that generated the decryption key 240. Thus, even if a person has access to the code 232 and can sign it with the signature 238, the code 232 may still be unable to cause decryption of the encrypted data 250 if placed on a secure enclave that is not the secure enclave 230.

The code 232 may include aggregation code 236. The aggregation code 236 may include a set of query and data transformation statements. The aggregation code 236 may perform aggregations on the data 208 or the data 208 and added noise. Performing the aggregation code 236 on the data 208 may result in the secure enclave 230 producing report 220 or figures for including in the report 220. The system 200 may store the report 220 on the data store 204. The report 220 may be subject to audit requirements 222.

The code 232 may include noise code 234. The noise code 234 may generate noise or obtain noise from a noise source. The noise code 234 may add noise into a process of the aggregation code 236 generating a report, such as the report 220. For example, the noise code 234 may add noise to the data 208 before the aggregation code 236 aggregates the data 208. As another example, the noise code 234 may add noise to the output of the aggregation code 236, such as to the report 220. As another example, the noise code 234 may add noise to parameters of a model generated by the aggregation code 236. The amount of noise the noise code 234 adds and the level or step at which the noise code 234 adds noise may impact how much the accuracy of the report 220 is reduced and how strong the report 220 will be against a privacy attack.

The noise code 234 may determine an amount of noise to add. The noise code 234 may add an amount of noise sufficient to ensure that the summary generated by the aggregation code 236 satisfies a particular privacy guarantee. The particular privacy guarantee may be a differential privacy guarantee. The particular privacy guarantee may be determined by the enterprise. The particular privacy guarantee may be based on the privacy requirements 224.

The processor 252 may include a signature module 254. The signature module 254 may apply the signature 238 to the code 232 before the code 232 is loaded into the secure enclave 230. The signature 238 may be tightly cryptographically bound to the decryption key 240. The decryption key 240 may be based in part on the signature 238.

The secure enclave 230 may include a verification module 244. The verification module 244 may verify that the code 232 includes the signature 238 and that the signature 238 is authentic. The secure enclave 230 may not generate the decryption key 240 or unlock the decryption key 240 until the verification module 244 verifies the signature 238. The verification module 244 may verify the signature 238 of the code 232 to make sure the code 232 has not been tampered with. The secure enclave 230 may not access the decryption key 240 until verifying that the code 232 has not been tampered with.

The secure enclave 230 may be limited to running the code 232, including the aggregation code 236 and the noise code 234. The decryption key 240 may be tightly bound to the code 232, including the aggregation code 236 and the noise code 234.

The secure enclave 230 may include attestation functionality. The attestation functionality may provide strong cryptographic assurances that the only operations that the secure enclave 230 can perform on the data 208 are the aggregation operations included in the aggregation code 236 and the noise adding functionality of the noise code 234. The secure enclave 230 may be hard coded to produce a defined report or a defined set of reports. In other words, the secure enclave 230 may provide means of producing the defined report or the defined set of reports and may not provide any additional functionality (at least with respect to the data 208). It may be possible to prove that the secure enclave 230 produces only the defined report or the defined set of reports when provided with the data 208 and does so using only the code 232. This attestation functionality may satisfy the audit requirements 222.

Using the secure enclave 230 provides strong audit guarantees and allows reports to be reproduced while ensuring the data 208 cannot be used for any purpose other than audits. In this case, because the data 208 is available to the secure enclave 230, the report 220 can be aggregated to a very high level. In other words, the report 220 does not need to tread closely to a boundary between private and non-private. As a result, the report 220 should not be classified as containing personal information. On the other hand, the data 208 would be retained exactly, albeit encrypted with a key that ensures impossibility of re-identification. GDPR uses the example of data that has been encrypted, and the encryption key subsequently destroyed, as being data that is "not personal data." So the enclave approach meets the regulatory requirements (such as the privacy requirements 224) for expungement whenever the enclave destroys the decryption key 240, even if the encrypted data 250 remains on the data store 204. The encrypted data 250 may also meet the privacy requirements 224 before the decryption key 240 is destroyed because the system 200 provides strong guarantees that only privacy-preserving transforms are possible.

It may be possible to persist the secure enclave 230 to disk, such as the data store 204. It may be possible to subsequently rehydrate the secure enclave 230.

The privacy requirements 224 may define obligations that must be met with respect to data that includes personal information. For example, the privacy requirements 224 may define minimum privacy guarantees that must be met by data aggregations of data that includes personal information.

The privacy requirements 224 may include expungement requirements 228. The expungement requirements 228 may define the types of data that must be expunged and the timing for expunging those types of data.

The audit requirements 222 may define obligations that must be met with respect to data used to generate a report. For example, the audit requirements 222 may define what an auditor must be able to do to verify numbers provided in the report.

The audit requirements 222 may include retention requirements 226. The retention requirements 226 may specify what information an enterprise must retain with respect to a report. The information that the enterprise must retain may be defined in terms of what an auditor must be able to verify about the process the enterprise used to generate the report.

The system 200 may be able to satisfy whatever obligations the privacy requirements 224 and the audit requirements 222 impose. For example, the expungement requirements 228 may apply to the data 208. The data 208 may be used to create the report 220, and the report 220 may be subject to the audit requirements 222. The time period for expunging the data 208 under the expungement requirements 228 may be shorter than the time period for retaining information under the audit requirements 222. The secure enclave 230 may satisfy the expungement requirements 228 by encrypting the data 208 such that only the secure enclave 230 can decrypt the data 208 and can do so only to generate the report 220. The secure enclave 230 may satisfy the retention requirements 226 because the secure enclave 230 can attest as to the process used to create the report 220 and allow the report 220 to be reproduced. An auditor can inspect the code 232 and rerun the code 232 because the encrypted data 250 is retained.

Figure 3:
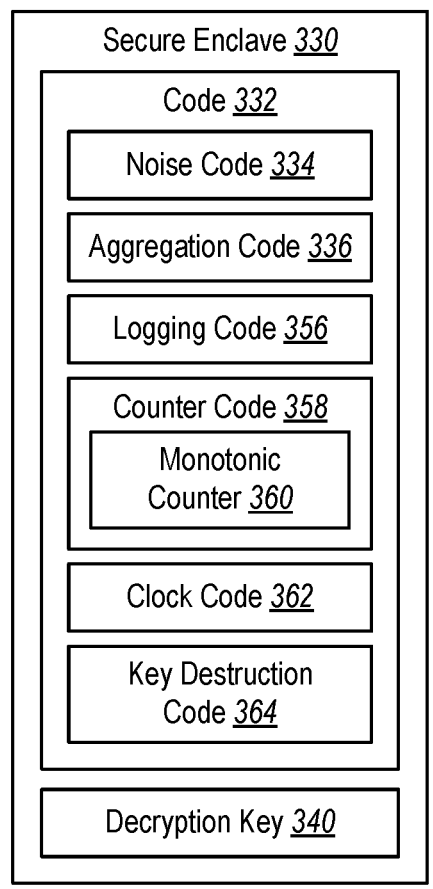
FIG. 3 illustrates an example secure enclave for satisfying audit requirements and privacy requirements using tamper-proof logging.

FIG. 3 illustrates an example secure enclave 330 for satisfying privacy requirements and audit requirements. The secure enclave 330 may include a decryption key 340 and code 332.

The decryption key 340 may enable decryption of encrypted data. The secure enclave 330 may have generated the decryption key 340. Only the secure enclave 330 may be able to access the decryption key 340. The data may have been encrypted using an encryption key generated by the secure enclave 330. The encryption key and the decryption key 340 may be bound to the secure enclave 330 and the code 332.

The code 332 may include noise code 334, aggregation code 336, logging code 356, counter code 358, clock code 362, and key destruction code 364. An auditor may be able to inspect the code 332. The code 332 may include a digital signature that verifies the authenticity of the code 332 and allows the secure enclave 330 to verify that the code 332 has not been tampered with since the secure enclave 330 generated the decryption key 340.

The noise code 334 may add noise to a process of generating a report. For example, the noise code 334 may add noise to data to generate noisy data. The noise code 334 may generate fresh noise each time a report is reproduced. Assuming that audits are a limited occurrence, generating fresh noise has a benefit that an original report and an audit of the original report would follow the exact same code path, and auditors would receive a slightly more accurate overall picture (within a privacy budget). This approach may rely on a random noise generator. A random noise generator has the benefit that the noise is more random but may be vulnerable to washing out noise through creating a report many times.

In the alternative, the noise code 334 may use a deterministic source of noise. The noise code 334 may use a seed known only to the secure enclave 330 or encrypt and store the noise used in the original report. Using the deterministic source of noise may allow audits to reproduce exactly the same numbers contained in the report. Depending on implementation, using the deterministic source may also ensure near-exact re-execution process. This approach may use a pseudo random number generator that repeats numbers after a certain number of runs. The noise code 334 may pick a spot to start the random number generator. The noise code 334 may not share the spot, meaning only the secure enclave 330 knows where the random number generator starts. When the noise code 334 adds randomness to the data, the noise code 334 can start in the same place each time the secure enclave 330 generates the report. As a result, the secure enclave 330 may generate the same report each time the secure enclave 330 is asked to create the report. An adversary may not know what the noise is because the adversary does not know where the random number generator started.

The aggregation code 336 may generate one or more reports. The aggregation code 336 may generate the one or more reports based on the data or the noisy data.

The logging code 356 may cause each use of the decryption key 340 to be logged. The logging code 356 may enable tamper-proof logging of all uses of the decryption key 340. The secure enclave 330 may be hard-coded with the logging code 356. The decryption key 340 may be cryptographically bound to the code 332, including the logging code 356. Thus, the secure enclave 330 may not access the decryption key 340 unless the code 332 includes the logging code 356. The logging code 356 may log start and end operations to a tamper-proof store. The tamper-proof store may be a long-running fault-tolerant cluster running a consensus algorithm like Raft, perhaps federated with parties outside an enterprise's control who are unlikely to collude with the enterprise. The tamper-proof store could be a large public blockchain, such as Ethereum. The logging code 356 may log operations as some meaningful hash included in a transaction to the large public blockchain. The logging code 356 ensures that logging happens each time the secure enclave 330 is used to generate a report. The choice of a tamper-proof store provides assurances against tampering.

The counter code 358 may cause each use of the decryption key 340 to be counted. The counter code 358 may retrieve a value of the number of times the decryption key 340 has been used. The secure enclave 330 may be hard-coded with the counter code 358. The decryption key 340 may be cryptographically bound to the counter code 358. Thus, the secure enclave 330 may not access the decryption key 340 unless the code 332 includes the counter code 358. The counter code 358 may cause the secure enclave 330 to track the number of times the decryption key 340 has been used. For example, the counter code 358 may increment a counter each time the secure enclave 330 uses the decryption key 340. The counter may be a monotonic counter 360 included in the secure enclave 330. An auditor may be able to inspect the monotonic counter 360 as part of the code 332 and verify that the monotonic counter 360 is being applied. In the alternative, the secure enclave 330 may use one of the tamper-proof stores described above to maintain and retrieve a count of times the decryption key 340 has been used.

The secure enclave 330 may destroy the decryption key 340 after the decryption key 340 has been used a maximum number of times. After each use of the decryption key 340, the secure enclave 330 may retrieve and increment a count of the number of times the decryption key 340 has been used. The secure enclave 330 may determine whether the count equals a destruction count. The destruction count may be defined in the code 332. If the count equals the destruction count, the secure enclave 330 may destroy the decryption key 340. The destruction count may be a pre-defined value. The destruction count may satisfy a fixed privacy budget. The fixed privacy budget may be defined by the enterprise or a third party. The fixed privacy budget may be based on privacy requirements.

The clock code 362 may support destroying the decryption key 340 after a fixed amount of clock time has passed since the decryption key 340 was generated, from a time when the decryption key 340 was first used, or from a different trigger event or time. It may be possible to tamper with a clock source. The clock code 362 may rely on a tamper-proof source of clock time. The secure enclave 330 may be hard-coded to trust a clock source that is likely to be trusted by privacy regulators, auditors, and users. Alternately, the secure enclave 330 may be hard-coded to reference a large public blockchain where proof-of-work difficulty is tied to clock time. For example, the Bitcoin block-mining process is a Poisson process tuned to return blocks on average every ten minutes, despite wide variance in actual block-mining times. Checking the block height on such a blockchain may not be accurate enough to expunge keys in increments of a few hours to a day or two but may be trustworthy for longer durations. Over much longer time frames, however, there may be greater risk that code or design changes to the underlying blockchain may make the block-to-clock calculations invalid. Therefore, the clock code 362 may include a periodic refresh mechanism for longer durations. For example, the clock code 362 may be designed to adjust the clock-to-block ratio (if needed) once per year, with such adjustments being logged. Before accessing the decryption key 340, the secure enclave 330 may determine whether the fixed amount of clock time has passed since a defined trigger event. If the fixed amount of clock time has passed, the secure enclave 330 may destroy the decryption key 340 before attempting to generate a report. The fixed amount of clock time may be defined in the code 332.

The key destruction code 364 may destroy the decryption key 340. The secure enclave 330 may not be able to recreate the decryption key 340. The key destruction code 364 may destroy the decryption key 340 after the decryption key 340 has been used a maximum number of times. The key destruction code 364 may destroy the decryption key 340 a defined period of time after a defined trigger event (such as the time the secure enclave 330 generated the decryption key 340). The key destruction code 364 may destroy the decryption key 340 after generating a report or before attempting to generate a report.

Without protections on use of the decryption key 340, an internal adversary may be able to rehydrate the secure enclave 330 multiple times to produce the report 220 and wash out the noise. The protections on use of the decryption key 340 mean that the secure enclave 330 can be rehydrated only a fixed number of times or that the report 220 can be run only a fixed number of times. The system can use a cluster to keep track of the number of reports run if the secure enclave 330 is not being rehydrated. For example, the system could use RAFT protocol and three different nodes that always have the same state to make it impossible to tamper with the state and support fault tolerance. But if the secure enclave 330 is being rehydrating, the system needs a way to track how many times a report has been run. For that reason, the secure enclave 330 may include the monotonic counter 360 or the counter code 358 may reference a tamper-proof store containing a count of the number of times the decryption key 340 has been used.

They system may create a digital signature of the report (which may be a pdf file). The system may place the report and the signature on a tamper-proof log. That way if someone tampers with the report, the signatures would not match. In the private synopsis approach, the system could create a digital signature for the private synopsis. In the secure enclave approach, the secure enclave can create a digital signature that only it can create but that anyone can verify.

The secure enclave 330 may be able to apply a diff patch to a previously generated report. A diff patch may show what is different between two documents. The diff patch can be applied to an original document to make it match a new document. An enterprise may make mistakes in some reporting periods and issue corrections or adjustments to ensure future reports are more accurate. Such mistakes are not normally penalized, as long as the adjustments are done in good faith and with proper auditability. A future audit may look at reproducing some numbers over a 7 year period, where the auditor knows that some of the years had incorrect data that was subsequently revised. The adjustments are normally not applied in the same reporting period the mistakes were made. For example, suppose an enterprise classified assets in a wrong category. A diff patch may say that the assets should be reclassified. The secure enclave 330 may receive the diff patch, decrypt the original source data, apply the patch, and re-run the report.

An enterprise may use a hybrid approach between the private synopsis approach and the secure enclave approach. For example, data may be encrypted and available to the secure enclave processor for a first period of time, such as 6 months or 1 year. After the first period of time, the data may be aggregated to a level with just enough privacy to meet expungement requirements and re-encrypted with a new key (and the old key destroyed). This aggregation may be optimized to support any necessary adjustments/restatements in the future. If the enterprise supports restatement going back for a shorter time span than a total audit retention period, the intermediate aggregation may be re-aggregated at a higher level and re-encrypted after the restatement deadline has passed. For example, the data might rest unencrypted on disk for 28 days and then be encrypted unaggregated for another 6 months. The encrypted data may be aggregated at a fine grain for three more years and then fully aggregated for another four years. These timeframes may depend on audit requirements, privacy requirements, and business goals.

Figure 4:
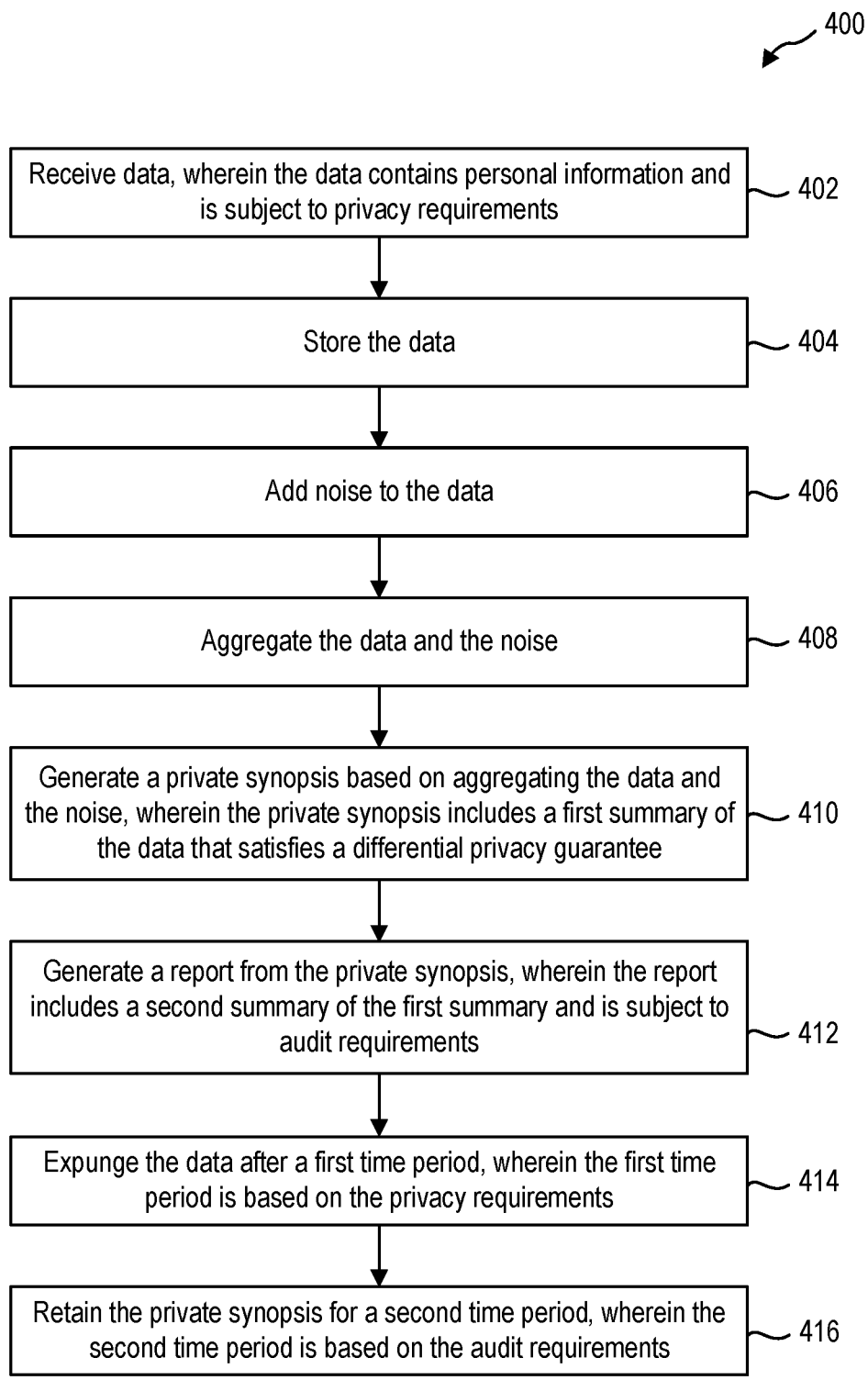
FIG. 4 illustrates an example method for using a private synopsis to retain data for an audit while protecting data from privacy attacks.

FIG. 4 illustrates an example method 400 for satisfying privacy requirements and audit requirements.

The method 400 may include receiving 402 data. The data may contain personal information and may be subject to the privacy requirements.

The method 400 may include storing 404 the data to a data store.

The method 400 may include adding 406 noise to the data. The noise added to the data may be random noise or deterministic noise.

The method 400 may include aggregating 408 the data and the noise. Aggregating 408 the data and the noise may include performing one or more functions or transformations on the data and the noise and returning the results of the functions or transformations without the underlying source records.

The method 400 may include generating 410 a private synopsis based on aggregating the data and the noise. The private synopsis may include a first summary of the data. The first summary of the data may satisfy a differential privacy guarantee. The differential privacy guarantee may be pre-defined. The differential privacy guarantee may be based on the privacy requirements.

The method 400 may include generating 412 a report from the private synopsis. The report may include a second summary of the first summary. The report may be subject to the audit requirements. The second summary may be at a higher level compared to the data than the first summary compared to the data. The report may satisfy the differential privacy guarantee.

The method 400 may include expunging 414 the data after a first time period. The first time period may be pre-defined. The first time period may be based on the privacy requirements. Expunging the data may satisfy the privacy requirements.

The method 400 may include retaining 416 the private synopsis for a second time period. The second time period may be pre-defined. The second time period may be based on the audit requirements. The second time period may be longer than the first time period. Retaining the private synopsis may satisfy the audit requirements with respect to the report. Retaining the private synopsis may not violate the privacy requirements.

Figure 5:
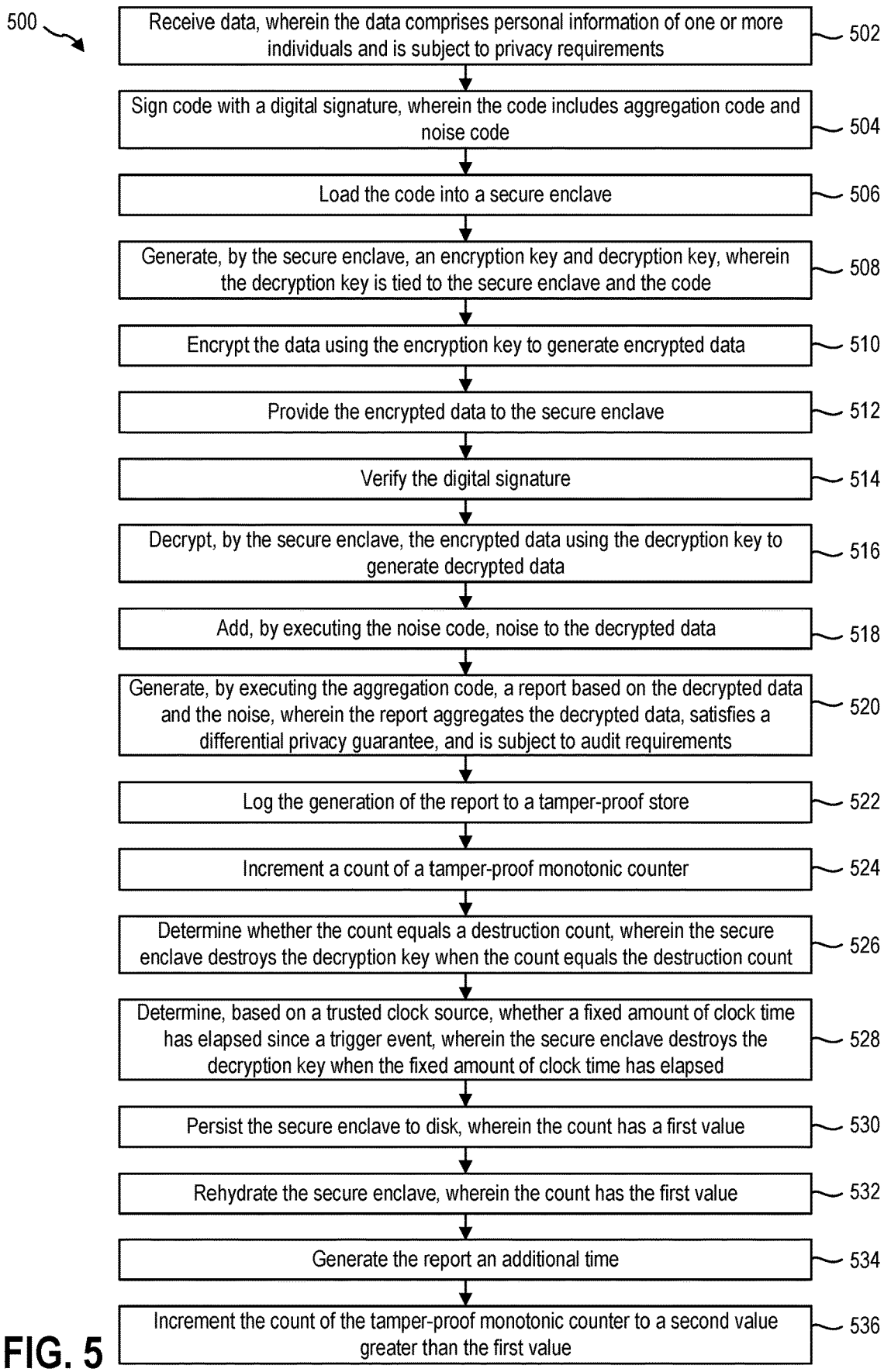
FIG. 5 illustrates an example method for using a secure enclave to satisfy retention and expungement requirements.

FIG. 5 illustrates an example method 500 for satisfying privacy requirements and audit requirements using a secure enclave.

The method 500 may include receiving 502 data. The data may comprise personal information of one or more individuals. The data may be subject to the privacy requirements.

The method 500 may include signing 504 code with a digital signature. The code may include aggregation code and noise code. The aggregation code may generate a report. The noise code may add noise to the process of generating the report. A processor may add the digital signature to the code. The code may be viewable by an auditor.

The method 500 may include loading 506 the code into a secure enclave.

The method 500 may include generating 508, by the secure enclave, an encryption key and a decryption key. The decryption key may be tied to the secure enclave and the code. The encryption key and the decryption key may be based on the digital signature, the secure enclave, and the code loaded into the secure enclave.

The method 500 may include encrypting 510 the data using the encryption key to generate encrypted data. Encrypting the data may result in the data becoming inaccessible except using the decryption key. Only the secure enclave may have access to the decryption key. Encrypting the data may satisfy the privacy requirements with respect to the data.

The method 500 may include providing 512 the encrypted data to the secure enclave.

The method 500 may include verifying 514 the digital signature. The secure enclave may verify the digital signature. Verifying 514 the digital signature may include verifying that the code has not been tampered with compared to the code loaded onto the secure enclave when the secure enclave generated the decryption key.

The method 500 may include decrypting 516, by the secure enclave, the encrypted data using the decryption key to generate decrypted data. The decrypted data may be equivalent to the data. The method 500 may not decrypt 516 the encrypted data unless the secure enclave verifies that the code has not been tampered with.

The method 500 may include adding 518, by executing the noise code, noise to the decrypted data.

The method 500 may include generating 520, by executing the aggregation code, a report based on the decrypted data and the noise. The report may aggregate the decrypted data, satisfy a differential privacy guarantee, and be subject to the audit requirements. An auditor may be able to inspect the aggregation code and the noise code. The differential privacy guarantee may be pre-determined based on the privacy requirements. The auditor may be able to verify that the secure enclave can decrypt the data only when provided with unmodified versions of the aggregation code and the noise code. The report may satisfy the audit requirements.

The method 500 may include logging 522 the generation of the report to a tamper-proof store. The code may include logging code that logs 522 the generation of the report to the tamper-proof store.

The method 500 may include incrementing 524 a count of a tamper-proof monotonic counter. The code may include counting code that increments 524 the count of the tamper-proof monotonic counter. The tamper-proof monotonic counter may be stored on the secure enclave or in a tamper-proof store.

The method 500 may include determining 526 whether the count equals a destruction count. The secure enclave may destroy the decryption key when the count equals the destruction count. The secure enclave may be incapable of reproducing the decryption key.

The method 500 may include determining 528, based on a trusted clock source, whether a fixed amount of clock time has elapsed since a trigger event. The code may include clock code that determines 528 whether the fixed amount of clock time has elapsed since the trigger event. The trigger event may be a first time the report was generated. The secure enclave may destroy the decryption key when the fixed amount of clock time has elapsed.

The method 500 may include persisting 530 the secure enclave to disk. The count may have a first value at the time the secure enclave is persisted to disk.

The method 500 may include rehydrating 532 the secure enclave. The count may have the first value at the time the secure enclave is rehydrated. The first value may be greater than zero.

The method 500 may include generating 534 the report an additional time.

The method 500 may include incrementing 536 the count of the tamper-proof monotonic counter to a second value greater than the first value.

Figure 6:
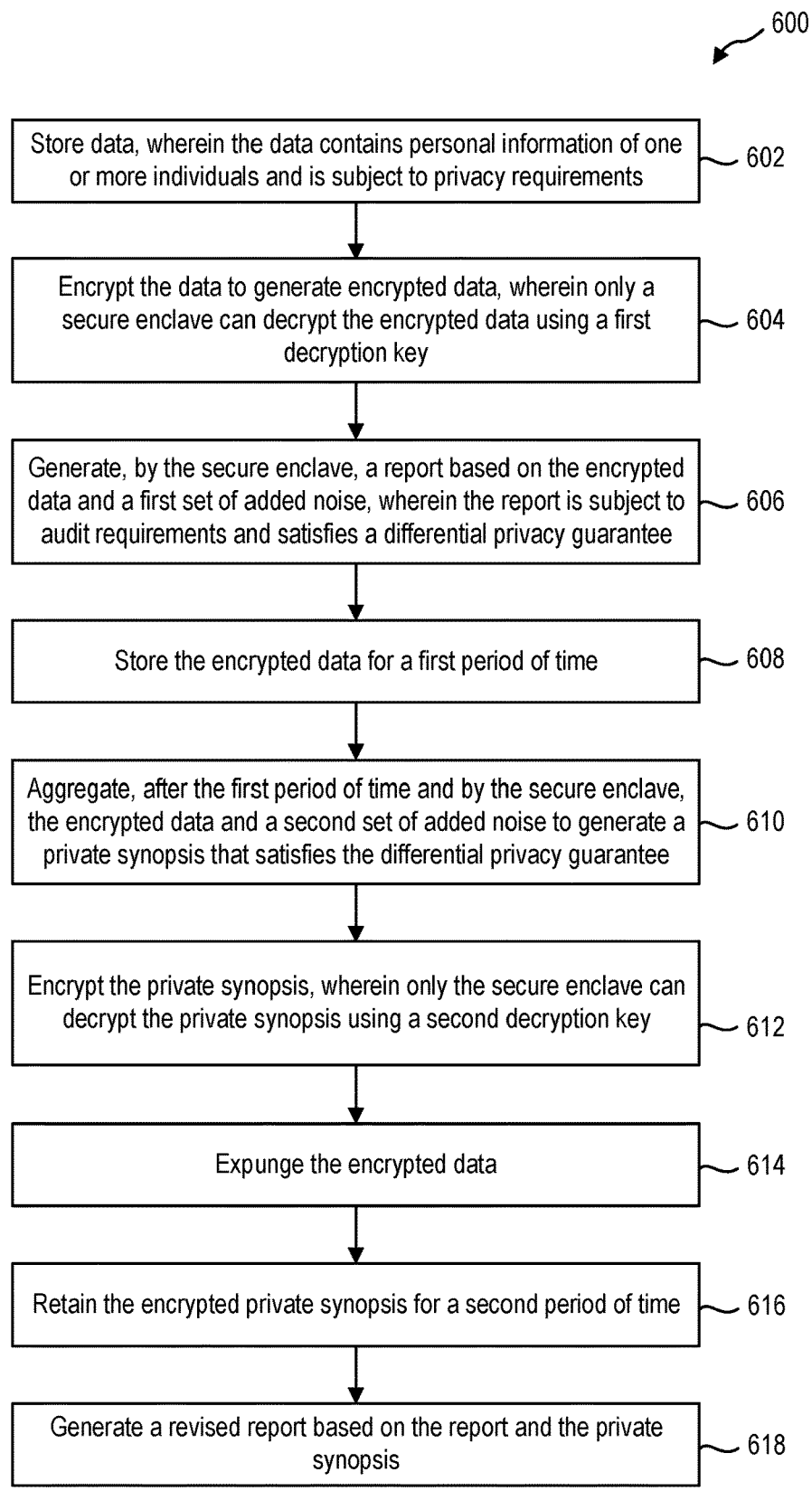
FIG. 6 illustrates an example hybrid approach for satisfying retention and expungement requirements.

FIG. 6 illustrates a method 600 illustrating a hybrid approach for satisfying privacy requirements and audit requirements.

The method 600 may include storing 602 data. The data may contain personal information of one or more individuals. The data may be subject to privacy requirements.

The method 600 may include encrypting 604 the data to generate encrypted data. Only a secure enclave can decrypt the encrypted data using a first decryption key. The secure enclave may generate the first decryption key.

The method 600 may include generating 606, by the secure enclave, a report based on the encrypted data and a first set of added noise. The report may be subject to audit requirements and satisfy a differential privacy guarantee. The differential privacy guarantee may be pre-defined based on the privacy requirements. The report may satisfy the privacy requirements.

The method 600 may include storing 608 the encrypted data for a first period of time. The first period of time may be pre-defined based on the audit requirements or the privacy requirements.

The method 600 may include aggregating 610, after the first period of time and by the secure enclave, the encrypted data and a second set of added noise to generate a private synopsis that satisfies the differential privacy guarantee.

The method 600 may include encrypting 612 the private synopsis. Only the secure enclave may be able to decrypt the private synopsis using a second decryption key. The secure enclave may generate the second decryption key. The private synopsis may satisfy the audit requirements.

The method 600 may include expunging 614 the encrypted data. Expunging 614 the encrypted data may occur after the first period of time.

The method 600 may include retaining 616 the encrypted private synopsis for a second period of time. The second period of time may be pre-defined based on the audit requirements.

The method 600 may include generating 618 a revised report based on the report and the private synopsis. The revised report may correct an error in the report. The secure enclave may generate the revised report. Only the secure enclave may generate the revised report.

Figure 7:
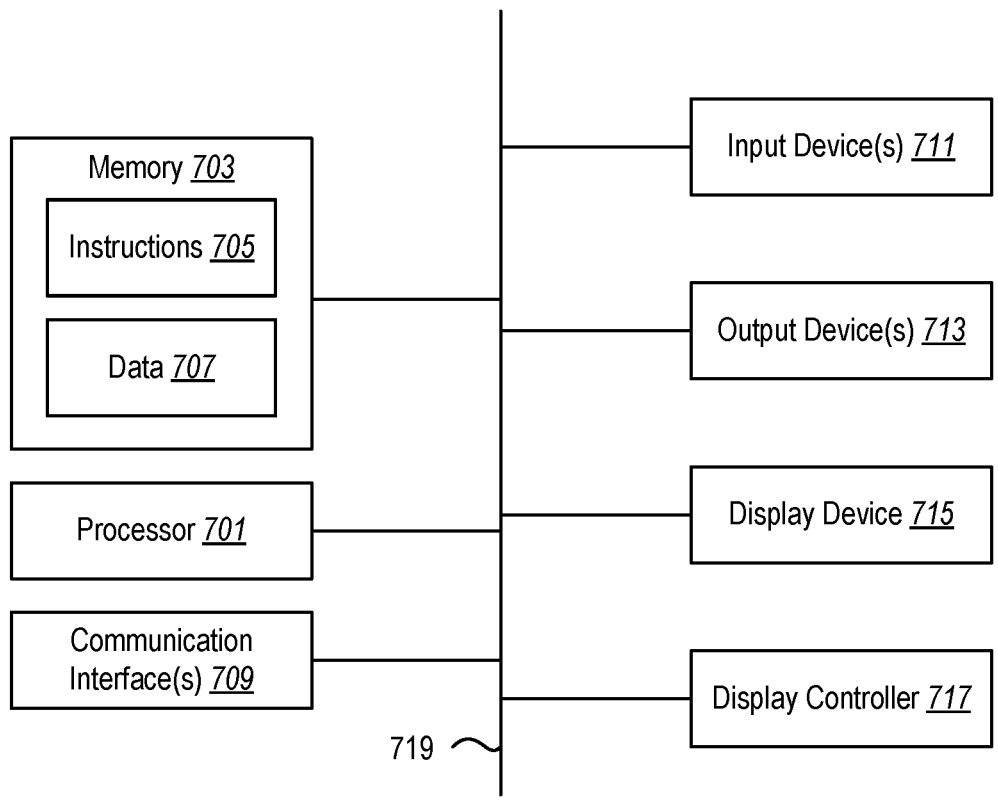
FIG. 7 illustrates certain components that may be included in a computing system.

FIG. 7 illustrates certain components that may be included within a computer system 700. One or more computer systems 700 may be used to implement the various devices, components, and systems described herein.

The computer system 700 includes a processor 701. The processor 701 may be a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 701 may be referred to as a central processing unit (CPU). Although just a single processor 701 is shown in the computer system 700 of FIG. 7, in an alternative configuration, a combination of processors (e.g., an ARM and DSP) could be used.

The computer system 700 also includes memory 703 in electronic communication with the processor 701. The memory 703 may be any electronic component capable of storing electronic information. For example, the memory 703 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 705 and data 707 may be stored in the memory 703. The instructions 705 may be executable by the processor 701 to implement some or all of the functionality disclosed herein. Executing the instructions 705 may involve the use of the data 707 that is stored in the memory 703. Any of the various examples of modules, components, packages, applications, and operating systems described herein may be implemented, partially or wholly, as instructions 705 stored in memory 703 and executed by the processor 701. Any of the various examples of data described herein may be among the data 707 that is stored in memory 703 and used during execution of the instructions 705 by the processor 701.

A computer system 700 may also include one or more communication interfaces 709 for communicating with other electronic devices. The communication interface(s) 709 may be based on wired communication technology, wireless communication technology, or both. Some examples of communication interfaces 709 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 700 may also include one or more input devices 711 and one or more output devices 713. Some examples of input devices 711 include a keyboard, mouse, microphone, remote control device, button, joystick, trackball, touchpad, and lightpen. Some examples of output devices 713 include a speaker and a printer. One specific type of output device that is typically included in a computer system 700 is a display device 715. Display devices 715 used with embodiments disclosed herein may utilize any suitable image projection technology, such as liquid crystal display (LCD), light-emitting diode (LED), gas plasma, electroluminescence, or the like. A display controller 717 may also be provided, for converting data 707 stored in the memory 703 into text, graphics, and/or moving images (as appropriate) shown on the display device 715.

The various components of the computer system 700 may be coupled together by one or more buses, which may include a power bus, a control signal bus, a status signal bus, a data bus, etc. For the sake of clarity, the various buses are illustrated in FIG. 7 as a bus system 719.

The techniques disclosed herein can be implemented in hardware, software, firmware, or any combination thereof, unless specifically described as being implemented in a specific manner. Any features described as modules, components, or the like can also be implemented together in an integrated logic device or separately as discrete but interoperable logic devices. If implemented in software, the techniques can be realized at least in part by a non-transitory computer-readable medium having computer-executable instructions stored thereon that, when executed by at least one processor, perform some or all of the steps, operations, actions, or other functionality disclosed herein. The instructions can be organized into routines, programs, objects, components, data structures, etc., which can perform particular tasks and/or implement particular data types, and which can be combined or distributed as desired in various embodiments.

As used in the present disclosure, a "cloud-computing system" may refer to a network of connected computing devices that provide various services to client devices. For example, a distributed computing system may include a collection of physical server devices (such as server nodes) organized in a hierarchical structure. Such a hierarchical structure may include computing zones, clusters, virtual local area networks (VLANs), racks, fault domains, etc. One or more specific examples and implementations described herein may relate specifically to "data centers" that include multiple server nodes. But the features and functionality described in connection with one or more node data centers may similarly relate to racks, fault domains, or other hierarchical structures of physical server devices. The cloud computing system may refer to a private or public cloud computing system.

The term "processor" can refer to a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, or the like. A processor can be a central processing unit (CPU). In some embodiments, a combination of processors (e.g., an ARM and DSP) could be used to implement some or all of the techniques disclosed herein.

The term "memory" can refer to any electronic component capable of storing electronic information. For example, memory may be embodied as random access memory (RAM), read-only memory (ROM), magnetic disk storage media, optical storage media, flash memory devices in RAM, on-board memory included with a processor, erasable programmable read-only memory (EPROM), electrically erasable programmable read-only memory (EEPROM) memory, registers, and so forth, including combinations thereof.

As used herein, non-transitory computer-readable medium (devices) may include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The steps, operations, and/or actions of the methods described herein may be interchanged with one another without departing from the scope of the claims. In other words, unless a specific order of steps, operations, and/or actions is required for proper functioning of the method that is being described, the order and/or use of specific steps, operations, and/or actions may be modified without departing from the scope of the claims.

The term "determining" (and grammatical variants thereof) can encompass a wide variety of actions. For example, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there can be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method comprising:
receiving data, wherein the data comprises personal information of one or more individuals and is subject to privacy requirements;
loading code into a secure enclave, wherein the code includes aggregation code and noise code;
generating, by the secure enclave, an encryption key and a decryption key, wherein the decryption key is tied to the secure enclave and the code;
encrypting the data using the encryption key to generate encrypted data;
decrypting, by the secure enclave, a copy of the encrypted data using the decryption key to generate decrypted data;
adding, by executing the noise code, noise to the decrypted data;
generating, by executing the aggregation code, a report based on the decrypted data and the noise, wherein the report aggregates the decrypted data, satisfies a differential privacy guarantee based on the privacy requirements, and is subject to audit requirements; and
retaining the encrypted data for a period of time based on the audit requirements.

2. The method of claim 1 further comprising:
signing the code with a digital signature; and
verifying, before decrypting the encrypted data, the digital signature.

3. The method of claim 1, wherein a length of the period of time is based on the audit requirements.

4. The method of claim 1, further comprising: logging the generation of the report to a tamper-proof store.

5. The method of claim 1, further comprising: incrementing a count of a tamper-proof monotonic counter.

6. The method of claim 5, wherein the tamper-proof monotonic counter is included in the code.

7. The method of claim 5, further comprising: determining, after generating the report, whether the count equals a destruction count, wherein the secure enclave destroys the decryption key when the count of the tamper-proof monotonic counter equals the destruction count.

8. The method of claim 5, further comprising:
persisting the secure enclave to disk, wherein the count has a first value;
rehydrating the secure enclave, wherein the count has the first value;
generating the report an additional time; and
incrementing the count of the tamper-proof monotonic counter to a second value greater than the first value.

9. The method of claim 1, further comprising: determining, based on a trusted clock source, whether a fixed amount of clock time has elapsed since generating the report, wherein the secure enclave destroys the decryption key when the fixed amount of clock time has elapsed.

10. The method of claim 1, wherein adding the noise comprises generating fresh noise.

11. The method of claim 1, wherein adding the noise comprises using a deterministic source of noise and only the secure enclave knows a seed of the deterministic source of noise.

12. A system comprising:
one or more processors;
memory in electronic communication with the one or more processors; and
instructions stored in the memory, the instructions being executable by the one or more processors to:
receive data, wherein the data comprises personal information of one or more individuals and is subject to privacy requirements;
load code into a secure enclave, wherein the code includes aggregation code and noise code;
generate, by the secure enclave, an encryption key and a decryption key, wherein the decryption key is tied to the secure enclave and the code;
encrypt the data using the encryption key to generate encrypted data;
provide the encrypted data to the secure enclave;
decrypt, by the secure enclave, the encrypted data using the decryption key to generate decrypted data;
add, by executing the noise code, noise to the decrypted data;
generate, by executing the aggregation code, a report based on the decrypted data and the noise, wherein the report aggregates the decrypted data, satisfies a differential privacy guarantee based on the privacy requirements, and is subject to audit requirements; and
retain a copy of the encrypted data for a period of time based on the audit requirements.

13. The system of claim 12, the instructions further being executable by the one or more processors to:
sign the code with a digital signature; and
verify, before decrypting the encrypted data, the digital signature.

14. The system of claim 12, wherein a length of the period of time is based on the audit requirements.

15. The system of claim 12, the instructions further being executable by the one or more processors to:
log the generation of the report to a tamper-proof store; and
increment a count of a tamper-proof monotonic counter.

16. The system of claim 15, the instructions further being executable by the one or more processors to: determine, after generating the report, whether the count equals a destruction count, wherein the secure enclave destroys the decryption key when the count of the tamper-proof monotonic counter equals the destruction count.

17. The system of claim 12, the instructions further being executable by the one or more processors to: determine, based on a trusted clock source, whether a fixed amount of clock time has elapsed since generating the report, wherein the secure enclave destroys the decryption key when the fixed amount of clock time has elapsed.

18. A non-transitory computer-readable medium comprising instructions that are executable by one or more processors to cause a computing system to:
receive data, wherein the data comprises personal information of one or more individuals and is subject to privacy requirements;
load code into a secure enclave, wherein the code includes aggregation code and noise code;

generate, by the secure enclave, an encryption key and a decryption key, wherein the decryption key is tied to the secure enclave and the code;

encrypt the data using the encryption key to generate encrypted data;

provide a copy of the encrypted data to the secure enclave;

decrypt, by the secure enclave, the copy of the encrypted data using the decryption key to generate decrypted data;

add, by executing the noise code, noise to the decrypted data;

generate, by executing the aggregation code, a report based on the decrypted data and the noise, wherein the report aggregates the decrypted data, satisfies a differential privacy guarantee based on the privacy requirements, and is subject to audit requirements; and retain the encrypted data for a period of time based on the audit requirements.

19. The non-transitory computer-readable medium of claim 18, further comprising additional instructions that are executable by the one or more processors to cause the computing system to:

log the generation of the report to a tamper-proof store;

increment a count of a tamper-proof monotonic counter; and determine, after generating the report, whether the count equals a destruction count, wherein the secure enclave destroys the decryption key when the count of the tamper-proof monotonic counter equals the destruction count.

20. The non-transitory computer-readable medium of claim 18, further comprising additional instructions that are executable by the one or more processors to cause the computing system to: determine, based on a trusted clock source, whether a fixed amount of clock time has elapsed since generating the report, wherein the secure enclave destroys the decryption key when the fixed amount of clock time has elapsed.

* * * * *